United States Patent
Pesch et al.

(10) Patent No.: US 6,896,610 B2
(45) Date of Patent: May 24, 2005

(54) AIR-GUIDING APPLIANCE

(75) Inventors: Michael Pesch, Erlenbach (DE); Peter Hamke, Lohne (DE); Thomas Bauer, Eppingen-Muhlbach (DE)

(73) Assignee: Utescheny AG, Zaisenhausen (DE)

( * ) Notice: Subject to any disclaimer, the term of this patent is extended or adjusted under 35 U.S.C. 154(b) by 0 days.

(21) Appl. No.: 10/792,638

(22) Filed: Mar. 2, 2004

(65) Prior Publication Data

US 2004/0171345 A1 Sep. 2, 2004

Related U.S. Application Data

(63) Continuation of application No. PCT/DE02/03364, filed on Sep. 10, 2002.

(30) Foreign Application Priority Data

Sep. 11, 2001 (DE) .......................................... 101 44 746

(51) Int. Cl.[7] ................................................ B60H 1/34
(52) U.S. Cl. ........................ 454/155; 454/313; 454/324
(58) Field of Search ................................. 454/152, 155, 454/313, 324

(56) References Cited

U.S. PATENT DOCUMENTS

| | | | | | |
|---|---|---|---|---|---|
| 2,835,187 | A | * | 5/1958 | Schell | 454/313 |
| 2,976,795 | A | * | 3/1961 | Brugler | 454/305 |
| 3,672,293 | A | * | 6/1972 | Gona et al. | 454/313 |
| 4,407,187 | A | * | 10/1983 | Horney | 454/324 |

FOREIGN PATENT DOCUMENTS

| | | | |
|---|---|---|---|
| DE | 24 44 116 A1 | * 3/1976 | 454/152 |
| DE | 32 02 355 A1 | 9/1982 | |
| EP | 1 059 178 A2 | 12/2000 | |
| FR | 2 585 637 A1 | 2/1987 | |
| JP | 61-38347 A | * 2/1986 | 454/155 |

* cited by examiner

Primary Examiner—Harold Joyce
(74) Attorney, Agent, or Firm—Darby & Darby

(57) ABSTRACT

An air-guiding appliance (10) for the directionally defined introduction of air supplied on the rear side of the appliance into a space (22), in particular interior of a vehicle, having a housing (26), an air-guiding guiding device (12) which has recesses on the front side and by means of which the direction of the air flowing out into the space (22) can be defined, means (16) for setting the direction of the air-guiding device (12) and, if appropriate, means for setting the quantity of air flowing into the space, an air-guiding body (30) or an air-guiding plate which has through-going recesses (32) which correspond with the front-side recesses and the air-charged rear side, the air-guiding body (30) or the air-guiding plate consisting of elastically deformable material, there being means (40.1, 40.2) for displacing the rear side of the air-guiding body (30)/air-guiding plate with respect to the fixed front side of the air-guiding body (30)/air-guiding plate, or vice versa, the displacement means (40.1, 40.2) being acted upon by the means (16) for setting the direction, so that a desired position of the through-going recesses (32) and therefore the desired inflow direction is set, and having a displacement plate (38) which is connected to the air-guiding body (30) or the air-guiding plate and has plate recesses (34) which correspond with the through-going recesses (32), is distinguished by the fact that the displacement plate (38) is connected at at least three points to the housing (26) at levers (42) which are mounted on balls on both sides.

16 Claims, 4 Drawing Sheets

AIR-GUIDING APPLIANCE

This application is a Continuation of International Patent Application No. PCT/DE02/03364, filed Sep. 10, 2002, which published in German on Mar. 20, 2003 as WO 03/022611 A1.

TECHNICAL FIELD

The present invention relates to an air-guiding appliance for the directionally defined introduction of air supplied on the rear side of the appliance into a space, in particular interior of a vehicle, having a housing, an air-guiding device which has recesses on the front side and by means of which the direction of the air flowing out into the space can be defined, means for setting the direction of the air-guiding device and, if appropriate, means for setting the quantity of air flowing into the space, an air-guiding body or an air-guiding plate which has through-going recesses which correspond with the front-side recesses and the air-charged rear side, the air-guiding body or the air-guiding plate consisting of elastically deformable material, there being means for displacing the rear side of the air-guiding body/air-guiding plate with respect to the fixed front side of the air-guiding body/air-guiding plate, or vice versa, the displacement means being acted upon by the means for setting the direction, so that a desired position of the through-going recesses and therefore the desired inflow direction is set, and having a displacement plate which is connected to the air-guiding body or the air-guiding plate and has plate recesses which correspond with the through-going recesses.

Such air-guiding appliances are used in great numbers in the interior of motor vehicles to control the air flow (direction and mass).

PRIOR ART

Air-guiding appliances are known which have "slat-type or roll-type dischargers" to control the direction of the air flow. In this case, visible and pivotable horizontal and vertical slats are pivoted by manual actuation via a mechanism "upward/downward" and "to the left/right" and the air flow is therefore controlled. The quantity of emerging air is set here manually via a handwheel which acts on the position of a pivotable flap arranged in the air-supply duct. This "open manner of construction" interferes with the optics or the design of the dashboard of a motor vehicle. The air-guiding appliance acts as a foreign body. In addition, the horizontal and vertical slats have a tendency to become dirty due to dust collecting in the corner regions which are accessible only with difficulty for cleaning purposes.

An air-guiding appliance of the type mentioned at the beginning is disclosed in EP 1 059 178 A2. In this case, an elastic air-guiding body is used which has through-going recesses through which the air flows. The direction of the air which flows out in a diffusion manner can be set by a relative movement of the front side or rear side of the air-guiding body.

SUMMARY OF THE INVENTION

The present invention is based on the object or the technical problem of specifying an air-guiding appliance of the type mentioned at the beginning which ensures that the direction of the air flow is set in a simple and lastingly reliable manner, which makes economical production and installation possible and at the same time provides good conditions in terms of comfort.

The air-guiding appliance according to the invention is specified by the features of independent claim 1. Advantageous refinements and developments are the subject matter of the dependent claims.

Accordingly, the air-guiding appliance according to the invention is distinguished by the fact that the displacement plate is connected at at least three points to the housing at levers which are mounted on balls on both sides. The mounting on balls enables the displacement plate to be moved in spherical dimensions, so that the distortions arising on account of the stress which is caused and acting on the air-guiding body during the setting process can be kept small. Overall, this results in the elastic air-guiding body, which consists, for example, of foam, being subjected to less stress, with the result that its service life is significantly increased.

One particularly preferred refinement of the air-guiding appliance according to the invention is distinguished by the fact that the displacement means have a first displacement mechanism and a second displacement mechanism which act on the displacement plate and by means of which the spatial outflow direction can be defined. In this case, the displacement means are preferably designed in such a manner that they are capable of providing two displacement directions which are perpendicular to each other in order therefore to ensure that the spatial angle of the air flowing out is set as desired in terms of the structurally predetermined limits of the outflow direction.

One refinement which is structurally particularly simple and can therefore be produced and fitted economically is distinguished by the fact that the first and second displacement mechanisms each have a rotatably drivable shaft to which is coupled in each case an eccentrically connected lever element or an eccentrically connected pair of lever elements or vice versa, which element or pair converts the rotational movement of the particular shaft into the corresponding translatory displacement of the displacement plate.

One particularly preferred development is distinguished by the fact that the means for setting the direction have drivable shafts which transfer their rotational movement, which arises on the basis of the setting undertaken in each case, to the corresponding, rotatable shaft by means of toothed belts and, if appropriate, by means of further, interconnected shafts and toothed belts. Owing to the fact that toothed belts are used between the rotatable shafts and the drivable shafts, it is easily possible to arrange the setting means irrespective of the position of the air-guiding appliance. This results in a multiplicity of design options for operating the air-guiding appliance. Thus, the setting may be undertaken directly in the immediate vicinity of the air-guiding appliance. On the other hand, it is possible that, for example from the driver's position within a vehicle, the air-inflow direction can be set at any position in the interior, for example on the front passenger's side.

In one preferred variant of the embodiment, the means for setting the direction of the inflowing air are designed as a track ball or drag ball which is to be operated manually.

One alternative, particularly advantageous refinement is distinguished by the fact that there are assemblies which are operated electrically, hydraulically or pneumatically and can be activated correspondingly and which set the direction of the air flowing in through the air-guiding appliance in accordance with the stipulations of an automatic control unit or in accordance with a manual stipulation.

In one preferred refinement, the air-guiding body has through-going recesses which are arranged in parallel at least in some regions. However, it is also possible, in order to produce a diffuse outflow profile, to provide through-going recesses which are arranged at a defined angle with respect to one another.

The cross section of the through-going recesses may be of variable design. The cross section is preferably round, polygonal or oval.

Particularly high demands in terms of design can therefore be met by the fact that, according to one preferred variant embodiment, the front side of the air-guiding body is of three-dimensional design, in particular has a spherically convex curvature. However, use may also be made of any other three-dimensional structures which meet the demands in terms of design in the region of the air-guiding appliance.

Further embodiments and advantages of the invention emerge through the features furthermore cited in the claims and through the exemplary embodiments specified below. The features of the claims can be combined with one another in any desired manner provided that they are not obviously mutually exclusive.

BRIEF DESCRIPTION OF THE DRAWING

The invention and advantageous embodiments and developments thereof are described and explained in greater detail below with reference to the examples illustrated in the drawing. The features which can be gathered from the description and the drawing can be used according to the invention individually or in any desired combination. In the drawing.

WAYS OF IMPLEMENTING THE INVENTION

Figure 1:
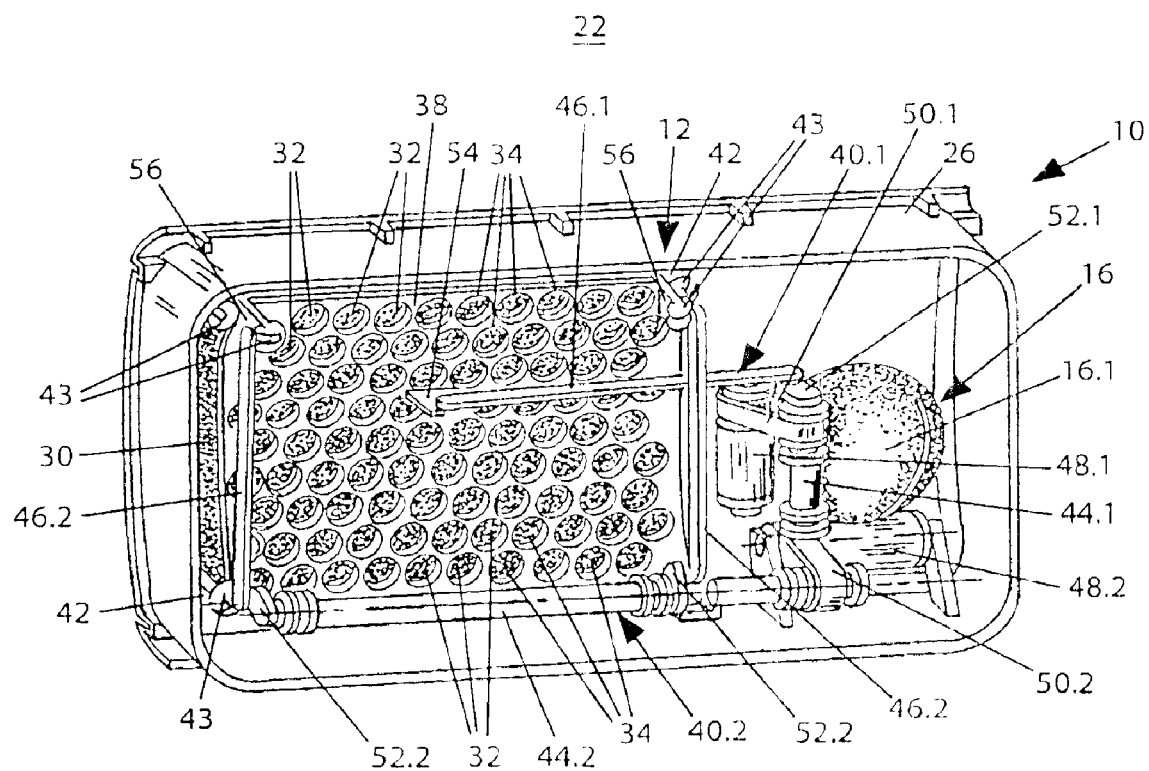
FIG. 1 shows a schematic perspective illustration of an air-guiding appliance as seen from the rear-side air-inflow direction, with two displacement mechanisms which are acted upon by a track ball/drag ball, FIGS. 2a, b how a schematic longitudinal section through an air-guiding appliance illustrating the displacement movement of the air-guiding body through the one, first displacement mechanism, FIGS. 3a, b show a schematic longitudinal section through an air-guiding appliance illustrating the displacement movement of the air-guiding body through the one, second displacement mechanism.

FIG. 1 illustrates, as seen from the rear side, an air-guiding appliance 10 which has a housing 26 and a cuboidal air-guiding device 12 arranged within the housing 26. On the front side, the air-guiding appliance 10 has a perforated screen 24 (FIG. 2) which is not visible in FIG. 1 and has recesses 14 in a predetermined grid. The perforated screen consists of high-quality design material, in particular of aluminum, stainless steel, wood veneered, leather-covered or of Kevlar which is man-made fibers for generalized use in the industrial arts. The air-guiding device 12 is connected fixedly to the perforated screen 24 and has an air-guiding body 30 which consists of elastic material and has through-going recesses 32 which correspond with the recesses 14 of the perforated screen 24. The air-guiding body 30 can be formed, for example, from foam.

On the rear side of the air-guiding body 30, i.e. on the side which faces a person looking at FIG. 1, a displacement plate 38 is connected to the air-guiding body 30, the displacement plate having, in turn, plate recesses 34 which correspond with the through-going recesses 32 of the air-guiding body 30.

The rectangular displacement plate 38 is connected at its four corner points to the housing 26 via a respective lever 42, with both the connection of the respective lever 42 to the displacement plate 38 and also to the housing 26 being designed as a ball-and-socket joint 43.

A displacement of the displacement plate 38 has the effect that the rear side of the air-guiding body 30 is displaced relative to the front side, as a result of which the direction R of the air L flowing through the recesses 32 can be set.

In order to displace the displacement plate 38 in the horizontal direction H and/or in the vertical direction V there is a first displacement mechanism 40.1 and a second displacement mechanism 40.2. These displacement mechanisms can be referred to in general as displacement means. Means 16 for setting the displacement, which means are designed in FIG. 1 as a "track ball" 16.1, act on these means for displacing the displacement plate 38.

In order to set the direction R, an operator has to correspondingly rotate the track ball 16.1. The rotation of the spherical track ball 16.1 sets a first drive shaft 48.1 and a second drive shaft 48.2 into rotation, the axes of rotation of the two shafts being perpendicular to each other. The rotational movement of the first drive shaft 48.1 is transmitted via a first toothed belt 50.1 to a first rotatable shaft 44.1, the axis of rotation of which runs parallel to the axis of rotation of the first drive shaft 48.1. A first projection unit 52.1 is connected to the first rotatable shaft 44.1 and a first lever element 46.1 is connected at its one end in an articulated manner to the free end region of said projection unit. The first lever element 46.1 is coupled at the other end to a further projection unit 54 which is connected fixedly to the displacement plate 38. Owing to the eccentric connection of the first lever element 46.1, the rotational movement of the first rotatable shaft 44.1 is converted into a horizontal movement H.

The conversion of the displacement of the displacement plate 38 in the vertical direction V takes place via a second drive shaft 48.2 which is set into rotation when the track ball 16.1 is rotated about a horizontal axis. This rotational movement is transmitted to a second rotatable shaft 44.2 via a second toothed belt 50.2. The second rotatable shaft 44.2 runs along the lower edge of the air-guiding body 30 as far as its edge region which is on the left in FIG. 1. Two second projection units 52.2 are connected to the second rotatable shaft 44.2 level with the left and right edge regions of the displacement plate 38. A respective second lever element 46.2 is connected at its one end in an articulated manner to the free end region of these two second projection units 52.2 and is connected in an articulated manner at its other end to further projection units 56 which is connected in turn fixedly to the displacement plate 38. This second displacement mechanism 40.2 is used to convert the rotational movement of the second rotatable shaft 44.2 into a vertical displacement V of the displacement plate 38 on the basis of the parallel guidance by the two second lever elements 46.2.

For reasons of clarity, the mounting of the shafts 44.1, 44.2 and 48.1, 48.2 within the housing 26 is not illustrated in greater detail in FIG. 1.

Figure 2A:
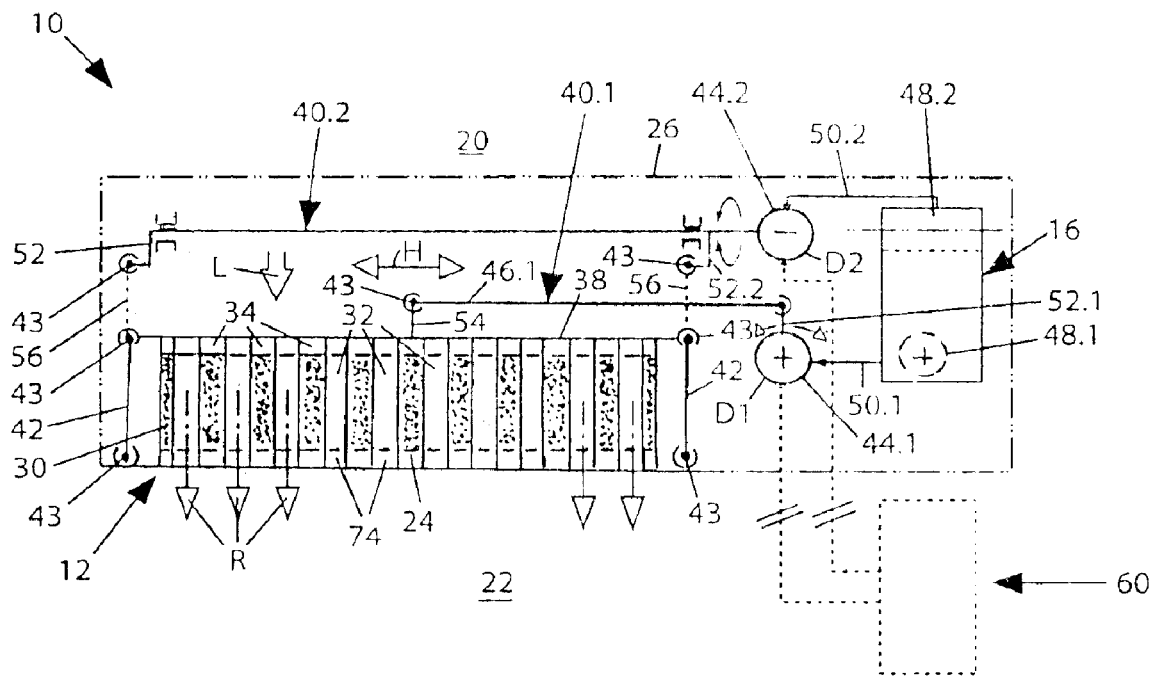
Figure 2B:
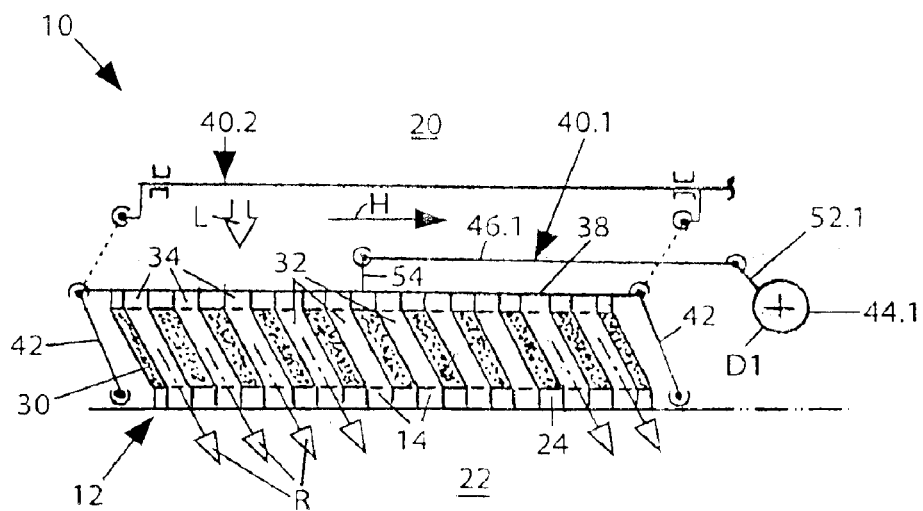

In FIG. 2, the displacement process in the horizontal direction is illustrated schematically. Owing to the means 16 for setting the direction, the first rotatable shaft 44.1 is set into rotation, in which case, according to the illustration in FIGS. 2a and b, the axis of rotation of the first rotatable shaft 44.1 is perpendicular to the plane of the sheet. As a result, the lever element 46.1, which is connected via the projection units 52.1 and 54, is displaced in the direction H and therefore so too is the rear side of the displacement plate 38, thus resulting in the displacement image which is illustrated in FIG. 2b with an inclined direction R of the emerging air L. The illustration in FIGS. 2a and b corresponds essentially to an illustration of a longitudinal section.

Figure 3A:
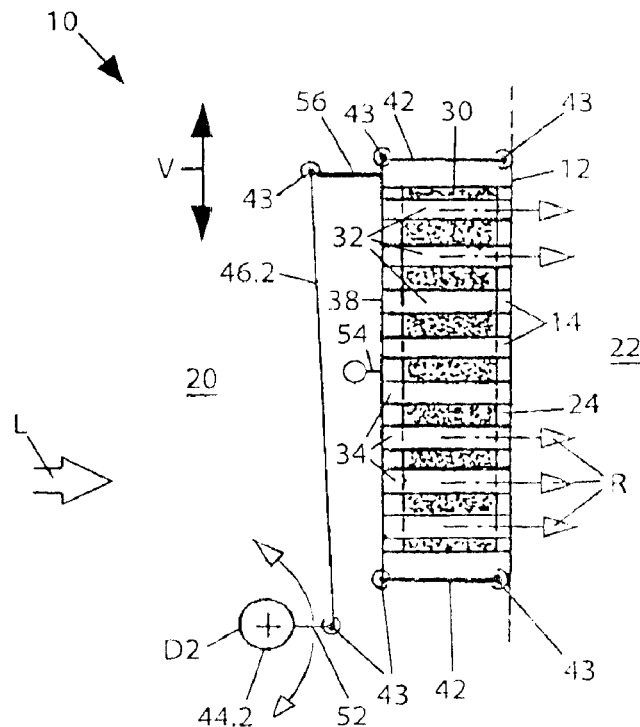
Figure 3B:
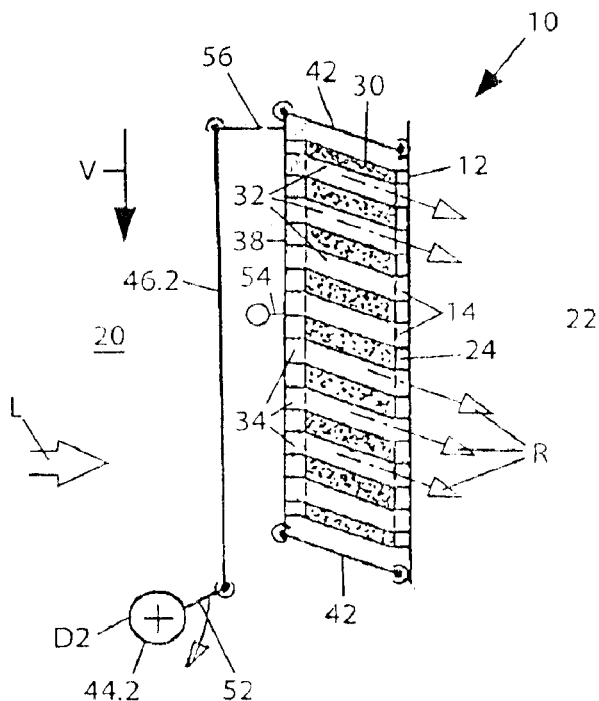

The illustration in FIGS. 3a and b corresponds essentially to a cross sectional illustration and clarifies the movement of the components during displacement of the displacement plate 38 in the direction V. As already explained above, the rotatable shaft 44.2 is set into rotation by the means 16 for setting the direction, as a result of which the second pair of lever elements 46.2, which pair is connected eccentrically via the projection units 52.2 and 56, is displaced in the direction V. As a result, the displacement plate 38, which is connected via the projection unit 56, is likewise also displaced in the vertical direction V, with the result that an inclination of the R of the emerging air L according to FIG. 3b occurs.

The combination of the displacement directions H and V enables any desired direction R to be set—within the predetermined structural boundaries.

The rear side, i.e. the side from which the air L is supplied to the air-guiding appliance 10, is provided with the reference number 20 in the figures. The space into which the air emerges in accordance with the setting in the direction R is provided with the reference number 22 in the figures.

Figure 4:
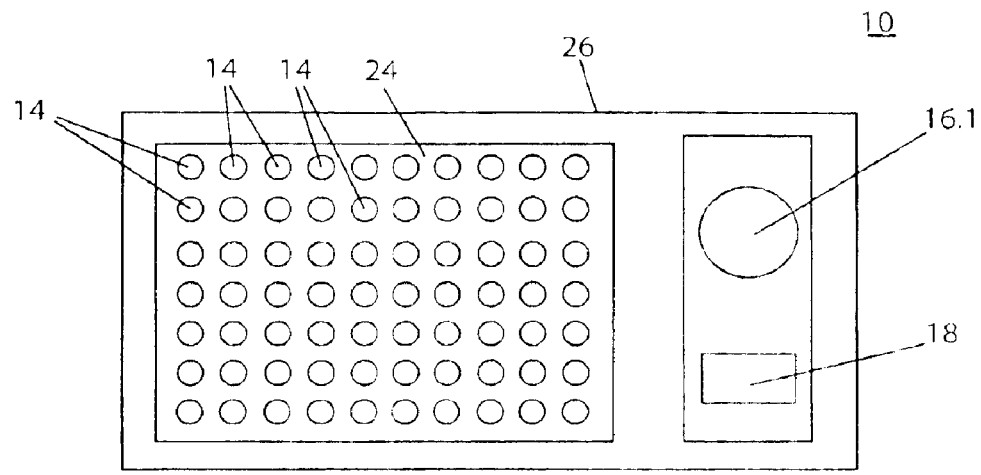
FIG. 4 shows a schematic front view of the air-guiding appliance according to FIG. 1.

FIG. 4 shows schematically the air-guiding device 10 in a front view. Means 18 for setting the quantity of air supplied to the air-guiding appliance 10 can be provided below the track ball 16.1.

Figure 5:
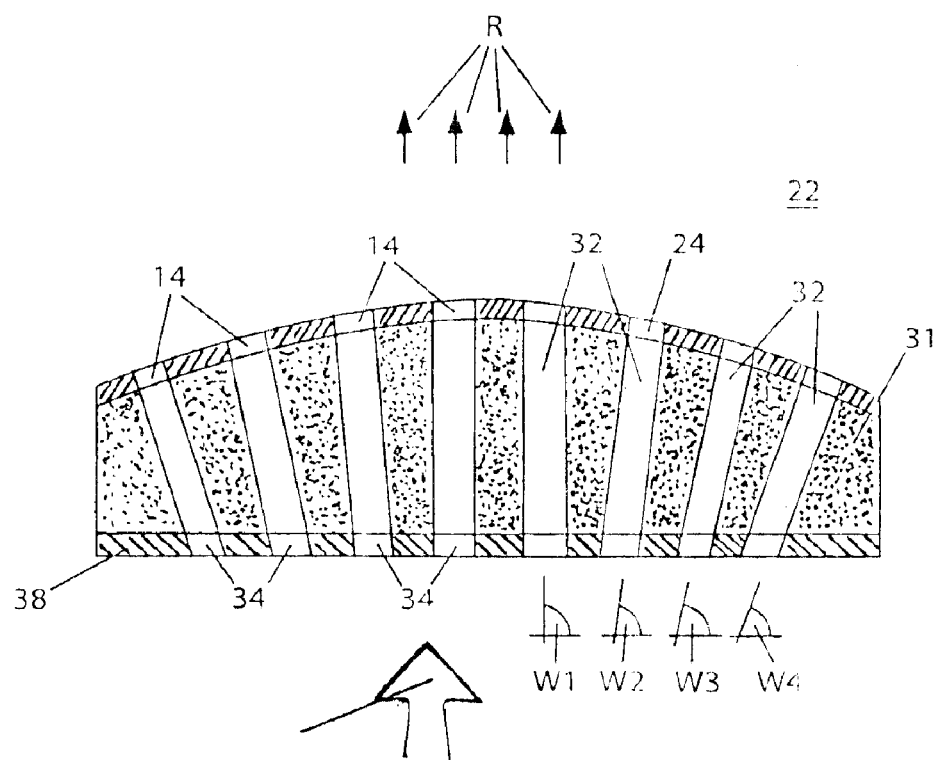
FIG. 5 shows a schematic longitudinal section through an air-guiding body having a spherical curvature and through-going recesses at a different angular arrangement to one another.

FIG. 5 illustrates schematically, in a longitudinal section, an embodiment of an air-guiding body 31 which has a spherical curvature on the outside and in which the through-going recesses 32 are arranged at different angles W1, W2, W3, W4 to one another, i.e. the direction of the through-going recesses 32 is designed such that it is inclined increasingly to the outside from the center.

In principle, any three-dimensional configuration of the air-guiding body 31 is conceivable.

The recesses may—as illustrated—be round. However, the cross sectional shape of the recesses 32 may be selected as desired, for example may be polygonal, oval or the like.

Further means 60 for setting the direction are illustrated schematically in FIG. 2a schematically by chain-dotted lines. Said further means can replace the means 16. Since the rotational movement for displacing the displacement plate 38 is transmitted by means of toothed belts, these setting means 60 can be provided further away from the air-guiding appliance 10. As a result, it is possible, for example for the interior of a vehicle, for the driver to be able to set the air direction R of all of the air-guiding appliances situated in the vehicle. The rotational movement, which ultimately brings about the displacement movement H, V of the displacement plate 38, can also take place by means of an activatable motor assembly which can be operated electrically, hydraulically or pneumatically.

What is claimed is:

1. An air-guiding appliance (10) for the directionally defined introduction (R) of air (L) supplied on the rear side (20) of the appliance into a space (22) of a vehicle, having
    a housing (26),
    an air-guiding device (12) which has recesses (14) on the front side and by means of which the direction (R) of the air flowing out into the space (22) can be defined,
    means (16) for setting the direction (R) of the air-guiding device (12),
    an air-guiding body (30) or an air-guiding plate which has through-going recesses (32) which correspond with the front-side recesses (14) and the air-charged rear side (20),
    the air-guiding body (30) or the air-guiding device consisting of elastically deformable material,
    means (40.1, 40.2) with lever element (46.1; 46.2) for displacing the rear side of the air-guiding body (30)/air-guiding plate with respect to the fixed front side of the air-guiding body (30)/air-guiding plate, or vice versa,
    the displacement means (40.1, 40.2) being acted upon by the means (16) for setting the direction, so that a desired position of the through-going recesses (32) and therefore the desired inflow direction (R) is set,
    and having a displacement plate (38) which is connected to the air-guiding body (30) or the air-guiding plate and has plate recesses (34) which correspond with the through-going recesses (32),
    the displacement means (40.1, 40.2) having a first displacement mechanism (40.1) and a second displacement mechanism (40.2) which act on the displacement plate (38) and by means of which the spatial outflow direction (R) can be defined, characterized in that
    the displacement plate (38) is connected at at least three points to the housing (26) at levers (42) which are mounted on balls on both sides, and
    projection units (54, 56) are connected to the displacement plate (38) and lever elements (46.1; 46.2) of the first and second displacement mechanisms (40.1; 40.2) are coupled in each case to the free end of said projection units.

2. The air-guiding appliance as claimed in claim 1, characterized in that
    the displacement means (40.1, 40.2) provide two displacement directions (H, V) which are perpendicular to each other.

3. The air-guiding appliance as claimed in claim 1 or characterized in that
    the first and second displacement mechanisms (40.1, 40.2) each have a rotatably drivable shaft (44.1, 44.2) to which is coupled in each case an eccentrically connected lever element (46.1) or an eccentrically connected pair of lever elements (46.2) or vice versa, which element or pair converts the rotational movement of the particular shaft (44.1, 44.2) into the corresponding translatory displacement (H, V) of the displacement plate (38).

4. The air-guiding appliance as claimed in claim 3, characterized in that
    the means (16) for setting the direction (R) have drivable shafts (48.1, 48.2) which transfer their rotational movement, which arises on the basis of the setting undertaken in each case, to the corresponding, rotatable shaft (44.1, 44.2) by means of toothed belts (50.1, 50.2).

5. The air-guiding appliance as claimed in claim 4, characterized in that
    the means (16) for setting the direction have a track ball/drag ball (16.1).

6. The air-guiding appliance as claimed in claim 4, characterized in that
    the means for setting the direction have at least one activatable assembly which is operated electrically, hydraulically or pneumatically.

7. The air-guiding appliance as claimed in claim 1, characterized in that
the through-going recesses (32) are arranged parallel to one another at least in some regions.

8. The air-guiding appliance as claimed in claim 1, characterized in that
the through-going recesses are arranged at least in some regions at a defined angle (W1 to W4) with respect to each other.

9. The air-guiding appliance as claimed in claim 1, characterized in that
the through-going recesses have a round, polygonal or oval cross section.

10. The air-guiding appliance as claimed in claim 1, characterized in that
the front side of the air-guiding body (31) has a spherically convex curvature.

11. The air-guiding appliance as claimed in claim 1, characterized in that
a perforated screen (24) is arranged on the front side of the air-guiding body.

12. The air-guiding appliance as claimed in claim 1, characterized in that
the means (40.1, 40.2) for displacing the displacement plate (38) are acted upon by an air-conditioning-system controlling means.

13. The air-guiding appliance as claimed in claim 11, characterized in that
the perforated screen consists of aluminum, stainless steel, wood veneered, leather-covered or of man made fibers.

14. An air guiding appliance in accordance with claim 1 wherein the space of the vehicle is its interior.

15. An air guiding appliance in accordance with claim 1 further comprising means for setting the quantity of air flowing into the space.

16. An air guiding appliance in accordance with claim 4 wherein the drivable shafts (48.1, 48.2) transfer their rotational movement to the corresponding, rotatable shaft (44.1, 44.2) by means of further, interconnected shafts and toothed belts.

* * * * *